United States Patent [19]

Schäfer et al.

[11] Patent Number: 5,242,978
[45] Date of Patent: Sep. 7, 1993

[54] ALKOXYSILYLAMINES AS CURING AGENTS FOR PLASTICS PRECURSORS CONTAINING ACETOACETATE OR ACETOACETAMIDE GROUPS

[75] Inventors: Walter Schäfer, Leichlingen; Hanns-Peter Müller, Bergisch Gladbach; Michael Sonntag, Odenthal, all of Fed. Rep. of Germany

[73] Assignee: Bayer Aktiengesellschaft, Leverkusen Bayerwerk, Fed. Rep. of Germany

[21] Appl. No.: 777,829

[22] Filed: Oct. 15, 1991

[30] Foreign Application Priority Data

Oct. 27, 1990 [DE] Fed. Rep. of Germany ....... 4034279

[51] Int. Cl.⁵ .................................................. C08F 8/00
[52] U.S. Cl. ..................................... 525/102; 525/446; 528/26; 528/38; 427/387; 106/12
[58] Field of Search ................... 528/26, 38; 525/100, 525/102, 446; 427/387; 106/12

[56] References Cited

U.S. PATENT DOCUMENTS

| | | | |
|---|---|---|---|
| 3,637,570 | 1/1972 | Stout | 260/33.6 SB |
| 3,668,183 | 6/1972 | Hoy et al. | 260/65 |
| 4,832,748 | 5/1989 | Tawara et al. | 523/454 |

FOREIGN PATENT DOCUMENTS

91/10698  7/1991  World Int. Prop. O. .

*Primary Examiner*—Ralph H. Dean, Jr.
*Attorney, Agent, or Firm*—Joseph C. Gil; N. Denise Brown

[57] ABSTRACT

The present invention is directed to a novel composition and the use thereof in various coating applications. The composition broadly comprises:

a) an organic compound containing a primary amino group and an alkoxysilane group, and b) a plastic precursor containing at least two acetoacetate and/or acetoacetamide groups per molecule.

5 Claims, No Drawings

ALKOXYSILYLAMINES AS CURING AGENTS FOR PLASTICS PRECURSORS CONTAINING ACETOACETATE OR ACETOACETAMIDE GROUPS

BACKGROUND OF THE INVENTION

The present invention relates to the use of certain alkoxysilylamines as curing agents for plastic precursors containing acetoacetate or acetoacetamide groups and to a process for the production of coatings on any substrates or for impregnating natural stone or concrete using coating or impregnating compounds based on a corresponding two-component binder.

It is known that polyacetyl acetates or polyacetoacetamides react spontaneously with polyamines to form crosslinked products (U.S. Pat. No. 3,668,183). However, the pot life of the system is too short for any practical application of the reaction. By blocking the polyamines with carbonyl compounds, it is possible to prepare stable mixtures. The mixture is only activated and crosslinked by exposure to moisture.

DESCRIPTION OF THE INVENTION

It has now surprisingly been found that polyacetoacetates or polyacetoacetamides can be reacted with aminofunctional alkoxysilanes to form polyenamines which have a long pot life and crosslink without exposure to atmospheric moisture. The latter is an advantage, for example, for coatings having a layer thickness of more than 50 $\mu$.

It was expected that the water formed during formation of the enamine by reaction of the polyacetoacetate or polyacetoacetamide with the aminosilane would lead immediately to siloxane structures and would thus promote spontaneous crosslinking of the polymer which is also equivalent to an excessively short pot life for practical application. Surprisingly, however, this was not the case. Instead, mixtures of plastic precursors containing acetoacetate and/or acetoacetamide groups of the type described herein with aminosilanes of the type described herein generally have a pot life of at least 30 minutes, the water formed by reaction of the polyacetoacetate or the polyacetoacetamide with the aminosilane leading in a gradual reaction to the crosslinking of the plastic precursors with formation of siloxane structures. It is of particular advantage in this regard that the water formed intermediately is formed "in situ", so that satisfactory during even of thick paint layers is guaranteed because the hardening reaction does not depend upon contact with atmospheric moisture.

The present invention relates to the use of a) organic compounds containing a primary amino group and an alkoxysilane group as curing agents for b) plastic precursors containing at least two acetoacetate and/or acetoacetamide groups per molecule.

According to the invention, any organic compounds containing one trialkoxysilyl group and one primary amino group per molecule are suitable in principle as the curing agents a). Preferred are compounds corresponding to formula (I)

wherein
R is an aliphatic hydrocarbon radical containing 2 to 6 carbon atoms, with the proviso that at least 2 carbon atoms are arranged between the nitrogen atom and the silicon atom, and R' represents an alkyl radical containing 1 to 4 carbon atoms and preferably 1 to 2 carbon atoms, and, more particularly a methyl group.

These aminofunctional silanes may be prepared by known methods (W. Noll, "Chemie und Technologie der Silicone", Verlag Chemie GmbH, Weinheim 1968).

Specific preferred aminofunctional silanes include 2-aminohexyl or 3-aminopropyl trimethoxysilane; 3-aminopropyl triethoxysilane; 4-aminobutyl trimethoxysilane and/or 4-aminobutyl triethoxysilane.

The plastic precursors b) are polymers having molecular weights Mn of from 400 to 25,000 and preferably from 700 to 15,000 which contain at least two acetoacetate and/or acetoacetamide groups per molecule. Particularly preferred are polymers having molecular weights in the above-mentioned range which contain at least two acetoacetate structural units corresponding to formula (II)

per molecule for a total content of such structural units in the polymers of 1 to 55% by weight and more preferably 8 to 40% by weight.

"Polyacetoacetates" or "polyacetoacetamides" such as these are known in principle (e.g., U.S. Pat. No. 3,668,183). They are prepared, for example, by reaction of the corresponding hydroxyfunctional and/or aminofunctional polymers with alkyl acetoacetates or with diketene.

Another possible method for producing these plastic precursors comprises copolymerizing olefinically unsaturated monomers, such as for example styrene, alkyl acrylates and/or methacrylates and the like with unsaturated acetoacetate-functional monomers which, in turn, may be obtained for example by reaction of hydroxyalkyl acrylates or methacrylates with diketene.

The plastic precursors b) are preferably produced by modification of compounds containing hydroxyl and/or amino groups, preferably hydroxyl groups only, as functional groups with diketene, for example at 80° to 150° C., optionally using suitable solvents, such as xylene.

Starting compounds suitable for the production of the plastic precursors b) are, for example, the polyhydroxyl compounds generally known from polyurethane chemistry having a molecular weights Mn of from 200 to approximately 25,000 and preferably from 500 to approximately 7,000. These molecular weights are approximate values. The molecular weight of these starting materials naturally corresponds to the molecular weight of the plastic precursors b) used in accordance with the invention minus the molecular weight of the acetacetate groups.

The molecular weight Mn of relatively high molecular weight polyols, polyamines or plastic precursors b) (molecular weight above approx. 5,000) may be determined by membrane osmometry. The molecular weight of the corresponding compounds of comparatively low molecular weight (molecular weight below 5,000) may be determined by calculation from the stoichiometry of the starting materials used in the preparation of the compounds or from the functionality and the functional group content or by vapor pressure osmometry.

Suitable starting compounds for the production of the plastic precursors b) also include, for example, the polyhydroxypolyesters generally known from polyurethane chemistry. Thus, polyesters having molecular weights Mn of from 200 to 3,000, prepared from polybasic carboxylic acids (such as adipic acid, phthalic acid, tetrahydrophthalic acid or hexahydrophthalic acid) or mixtures of such polycarboxylic acids with monobasic acids (such as benzoic acid or stearic acid), with overstoichiometric quantities of polyhydric alcohols (such as for example ethylene glycol, propylene glycol, hexane-1,6-diol, trimethylol propane, glycerol, neopentyl glycol and/or pentaerythritol) are suitable.

Other suitable starting compounds are the polyhydroxypolyethers generally known from polyurethane chemistry. These polyethers have molecular weights of from 200 to 25,000 and (average) hydroxyl functionalities of 2 to 6 and preferably 2 to 3. They may be obtained in known manner by alkoxylation of suitable starter molecules. Suitable starter molecules include, for example, the polyhydric alcohols just mentioned or mixtures thereof. Ethylene oxide and/or propylene oxide are preferably used for the alkoxylation. Such oxide may be reacted in admixture and/or in any order.

Also suitable are the hydroxyfunctional polyacrylates known from polyurethane paint technology. These typically have molecular weights Mn of from 1,000 to 15,000 and hydroxyl group contents of 1 to 10% by weight. These compounds are prepared in known manner by copolymerization of olefinically unsaturated monomers using hydroxyfunctional, olefinically unsaturated monomers. Suitable monomers include, for example, alkyl acrylates and/or methacrylates containing 1 to 6 carbon atoms in the alkyl group, such as for example methyl acrylate, methyl methacrylate, ethyl acrylate, ethyl methacrylate, n-butyl acrylate or n-hexyl methacrylate and/or styrene. Suitable hydroxyfunctional monomers include, for example, hydroxyalkyl acrylates or methacrylates containing 2 to 6 carbon atoms in the hydroxyalkyl group, such as for example hydroxyethyl, 2-hydroxypropyl, 3-hydroxypropyl, 4-hydroxybutyl or 6-hydroxyhexyl acrylate of methacrylate.

The aminopolyethers generally known from polyurethane chemistry, for example those recommended in European Patent 81,701 for the production of molded plastics, are also suitable, but are less preferred.

In the use according to the invention, the curing agents a) and the plastic precursors b) are preferably used in a quantitative ratio which corresponds to an equivalent ratio of primary amino groups of the curing agent a) to acetoacetate or acetoacetamide groups of the plastic precursor b) of 0.5:1 to 1:1 and preferably 0.8:1 to 1:1.

The combinations according to the invention of plastic precursors b) and curing agents a) are valuable two-component binders for coating compositions for any substrates or impregnating compounds, more particularly for natural stone or concrete.

Accordingly, the present invention also relates to a process for the production of coatings on any substrates using a coating composition containing a two-component binder and the auxiliaries and additives typically used in paint technology, characterized in that the two-component binder consists of a) a curing agent corresponding to formula (I)

$$H_2N-R-Si(OR')_3 \quad (I)$$

wherein

R is an aliphatic hydrocarbon radical containing 2 to 6 carbon atoms, with the proviso that at least 2 carbon atoms are arranged between the nitrogen atom and the silicone atoms, and R' is an alkyl group containing 1 to 4 carbon atoms, and b) at least one polymer having a molecular weight Mn of from 400 to 25,000 which contains at least two structural units corresponding to formula (II)

$$CH_3-\overset{O}{\underset{\|}{C}}-CH_2-\overset{O}{\underset{\|}{C}}-O- \quad (II)$$

in the molecule for a content of such structural units, based on the weight of the polymer, of 1 to 55% by weight, the quantities of components a) and b) corresponding to a molar ratio of compounds corresponding to formula (I) to structural units corresponding to formula (II) of 0.5:1 to 1:1.

Finally, the present invention also relates to a process for impregnating natural stone or concrete for preservation purposes using an impregnating compound which contains a two-component binder in addition to typical auxiliaries and additives, characterized in that two component binder comprises a) a curing agent corresponding to formula (I)

$$H_2N-R-Si(OR')_3 \quad (I)$$

wherein R and R' are as defined above, and b) at least one polymer having a molecular weight Mw in the range from 400 to 25,000 which contains at least two structural units corresponding to formula (II)

$$CH_3-\overset{O}{\underset{\|}{C}}-CH_2-\overset{O}{\underset{\|}{C}}-O- \quad (II)$$

in the molecule for a content of such structural units, based on the weight of the polymer, of 1 to 55% by weight, the quantities of components a) and b) corresponding to a molar ratio of compounds corresponding to formula (I) to structural units corresponding to formula (II) of 0.5:1 to 1:1.

The described combinations of curing agent a) and plastic precursor b), optionally already prepared using solvents of the type generally known from paint technology, are used as two-component binders in the process according to the invention for the production of coatings or impregnations.

Suitable solvents which may be used in the coating or impregnating compounds and which may already have been used in the production of the binder combinations include, for example, ethanol, propanol, butanol, methoxyethanol, methoxypropanol, methoxypropyl acetate, dimethoxyethane, toluene, xylene, benzyl acetate and mixtures thereof.

In general, the solids content of the coating or impregnating compounds according to the invention is between 10 and 80% by weight.

In addition to the solvents mentioned by way of example, the coating or impregnating compounds may themselves contain other known auxiliaries and additives, including for example, flow control agents, fillers or pigments.

After the binder components a) and b) have been combined, the coating compositions according to the invention generally have a pot life of at least 30 minutes in the form of a 50% solution.

In the production of coatings, the coating compositions according to the invention are preferably applied in dry film thicknesses of 5 to 200 μm. Suitable substrates are, in particular, metals, stone, glass, plastics and wood.

Where the combinations of components a) and b) according to the invention are used as impregnating compounds, particularly for natural stone or concrete, they are preferably used in the form of 15 to 50% by weight solutions in the solvents mentioned above.

The following Examples are intended to illustrate the invention without limiting it in any way.

EXAMPLES

Production of Plastic Precursors

Plastic Precursor I 170 g of a polyacrylate resin, molecular weight Mn 10,000, produced by copolymerization of 70 parts by weight methyl methacrylate, 15 parts by weight n-butyl acrylate and 15 parts by weight hydroxyethyl methacrylate are dissolved in n-butyl acetate to form a 50% by weight solution. 8.4 g diketene are then added to the solution, followed by heating with stirring for 1 hour to 100° C. The reaction mixture is then stirred for 8 hours at 120° to 130° C. and then freed from the solvent. The pale yellow resin thus isolated contains 9 g acetoacetate groups (determined by potentiometric titration of the acidic methylene groups with 0.1N KOH) per 100 g.

Plastic Precursor II 215.5 g of a polyhydroxypolyester (0.25 mol OH) prepared from 12 parts by weight trimethylol propane, 10 parts by weight pentaerythritol, 21 parts by weight benzoic acid, 28 parts by weight phthalic acid and 20 parts by weight of a commercially available branched $C_{18}$ fatty acid (Unimac 5680, a product of Unilever) are dissolved in xylene to form a 60% by weight solution. 21 kg diketene are then added to the solution. The further reaction and working up are carried out in the same way as for plastic precursor I. The resulting yellow resin contains 14 g acetoacetate groups per 100 g.

EXAMPLE 1

3.5 g 3-aminopropyl triethoxysilane are added to 33 g of plastic precursor I dissolved in 33 g n-butyl acetate and the mixture is applied to a degreased metal plate. The reaction mixture gels in 4 hours. The coating is dry and tack-free after 15 minutes. The coating withstands more than 100 double wipes with a cotton wool pad impregnated with methyl ethyl ketone. The König pendulum hardness (DIN 53 157) measures 140 s (23° C./50% relative air humidity).

EXAMPLE 2

2.8 g 3-aminopropyl trimethoxysilane are added to 33 g of plastic precursor I dissolved in 33 g n-butyl acetate and the mixture is applied to a degreased metal plate. The reaction mixture gels in 1 hour. The coating withstands more than 70 double wipes with a cotton wool pad impregnated with methyl ethyl ketone. The König pendulum hardness (DIN 53 157) measures 120 s (23° C./50% relative air humidity).

EXAMPLE 3

5 g 3-aminopropyl trimethoxysilane are added to 20 g of plastic precursor II dissolved in 33 g n-butyl acetate and the mixture is applied to a degreased metal plate. The reaction mixture gels in 45 minutes. The coating is dry and tack-free after 1 hour. The coating withstands more than 100 double wipes with a cotton wool pad soaked with methyl ethyl ketone. The König pendulum hardness (DIN 53 157) measures 80 s (23° C./50% relative air humidity).

What is claimed is:

1. A composition comprising:
   a) an organic compound containing a primary amino group and an alkoxysilane group, and
   b) a plastic precursor which is a polymer having a number average molecular weight of from 400 to 25,000 and containing at least two acetoacetate and/or acetoacetamide groups per molecule.

2. The composition of claim 1, wherein component a) is a compound corresponding to formula (I)

$$H_2N-R-Si(OR')_3 \qquad (I)$$

wherein

R is an aliphatic hydrocarbon radical containing 2 to 6 carbon atoms, with the proviso that at least 2 carbon atoms are arranged between the nitrogen atom and the silicone atom, and R' is an alkyl radical containing 1 to 4 carbon atoms.

3. The composition of claim 2, wherein said plastic precursor contains a total of from 1 to 55% by weight, based on the weight of the polymer, of at least two structural units corresponding to formula (II)

$$\underset{CH_3-C-CH_2-C-O-}{\overset{O \qquad O}{\underset{\|}{\|} \quad \underset{\|}{\|}}} \qquad (II)$$

per molecule.

4. In a process for the production of coatings on a substrate by applying a coating composition which contains a two-component binder and additives, the improvement wherein the two-component binder comprises a) a curing agent corresponding to formula (I)

$$H_2N-R-Si(OR')_3 \qquad (I)$$

wherein

R is an aliphatic hydrocarbon radical containing 2 to 6 carbon atoms, with the proviso that at least 2 carbon atoms are arranged between the nitrogen atom and the silicon atom, and R' represents an alkyl radical containing 1 to 4 carbon atoms, and b) at least one polymer having a number average molecular weight of from 400 to 25,000 which contains a total of from 1 to 55% by weight, based on the weight of the polymer, of at least two structural units corresponding to formula (II)

$$\underset{CH_3-C-CH_2-C-O-}{\overset{O \qquad O}{\underset{\|}{\|} \quad \underset{\|}{\|}}} \qquad (II)$$

in the molecule, the quantities in which components a) and b) corresponding to a molar ratio of compounds corresponding to formula (I) to structural units corresponding to formula (II) of 0.5:1 to 1:1.

5. In a process for impregnating natural stone or concrete for preservation purposes by applying an impregnating compound containing a two-component binder and additives, the improvement wherein the two-component binder comprises a) a curing agent corresponding to formula (I)

$$H_2N-R-Si(OR')_3 \qquad (I)$$

wherein

R is an aliphatic hydrocarbon radical containing 2 to 6 carbon atoms, with the proviso that at least 2 carbon atoms are arranged between the nitrogen atom and the silicon atom, and R' represents an alkyl radical containing 1 to 4 carbon atoms, and b) at least one polymer having a number average molecular weight of from 400 to 25,000 which contains a total of from 1 to 55% by weight, based on the weight of the polymer, of at least two structural units corresponding to formula (II)

$$\underset{\underset{CH_3-C-CH_2-C-O-}{\|}}{O} \quad \underset{\|}{O} \qquad (II)$$

in the molecule, the quantities in which components a) and b) corresponding to a molar ratio of compounds corresponding to formula (I) to structural units corresponding to formula (II) of 0.5:1 to 1:1.

* * * * *